UNITED STATES PATENT OFFICE.

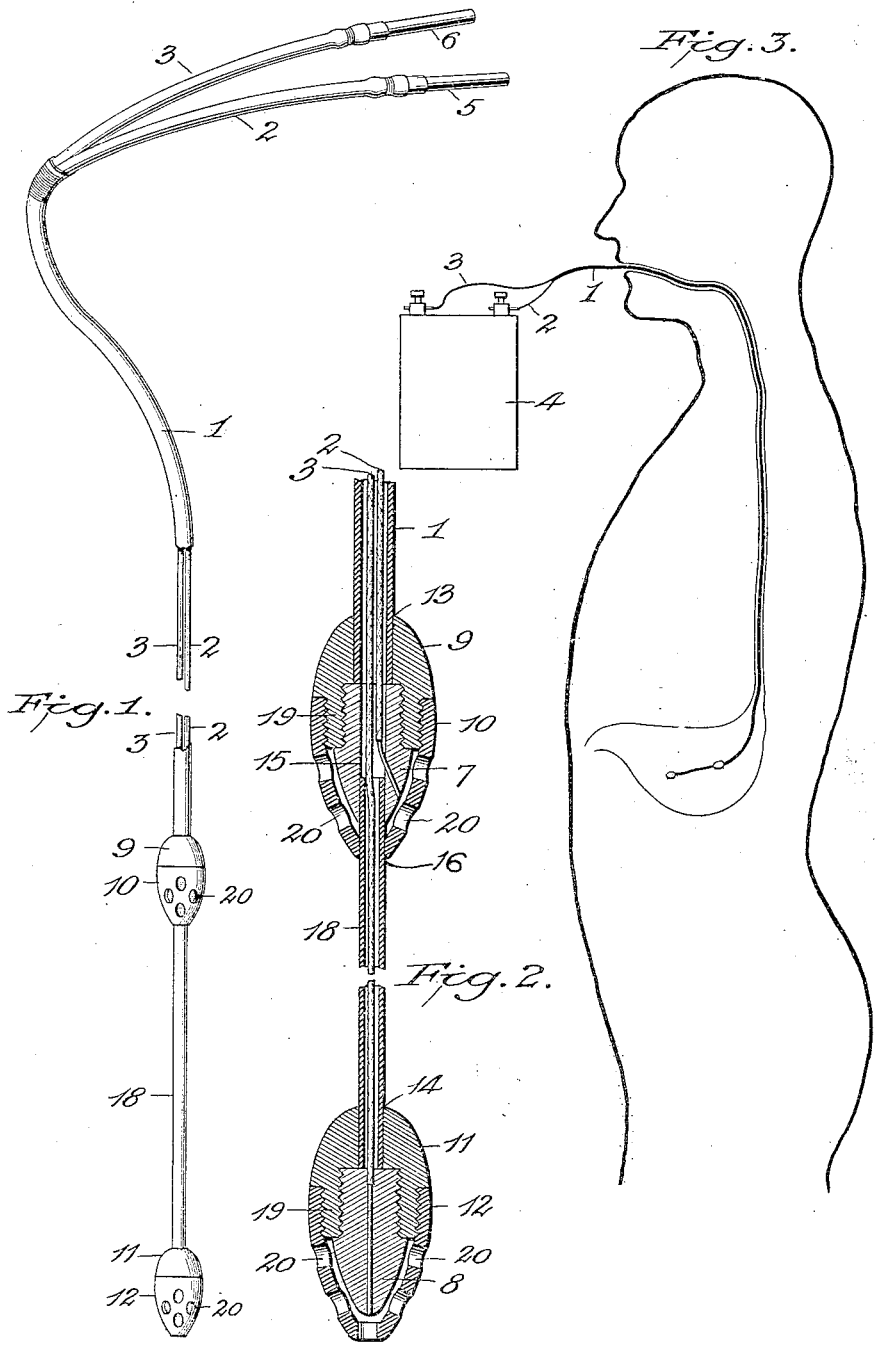

ALLAN G. HURDMAN, OF DENVER, COLORADO.

BIPOLAR INTRAGASTRIC ELECTRODE.

1,056,336.     Specification of Letters Patent.     Patented Mar. 18, 1913.

Application filed September 24, 1909. Serial No. 519,455.

*To all whom it may concern:*

Be it known that I, ALLAN G. HURDMAN, a subject of the King of Great Britain, residing in the city and county of Denver and State of Colorado, have invented a new and useful Bipolar Intragastric Electrode, of which the following is a specification.

My invention relates to a new intra-gastric electrode for medicinal use in the treatment of stomach diseases; and the objects of my invention are, first, to provide a bi-polar intra-gastric electrode; second, to provide a bi-polar intra-gastric electrode in which the electrodes are insulated from contact with the gastric mucosa, and at the same time permit the current to flow freely through the walls of the stomach between the poles, and, third, to provide a bi-polar intra-gastric electrode that can be easily inserted in the stomach and that will diffuse an electric faradic or galvanic current throughout the tissues and walls of the stomach. I attain these objects by the mechanism illustrated in the accompanying drawings, in which:

Figure 1 is a side view—full size—of the improved device, a portion of the length of the wires and tubing being omitted for convenience. Fig. 2 is an enlarged vertical sectional view through the parts constituting the invention; and Fig. 3 is a diagrammatic view illustrating the operation of the device.

Referring to the drawings, the numeral 1 designates a hollow flexible cord-like tubular covering member, which may be made of any suitable material. I preferably use for this flexible cord-like member a soft pliable rubber tube. This rubber tube is of ample length to be attached at one end to a source of electricity, such as a small dynamo or a battery, and for the opposite end to be inserted through the mouth of a person into the stomach. This rubber tube forms a flexible casing or covering of two small insulated electric current conductive wires 2 and 3, which project from the rubber tube at one end far enough to be attached to the negative and positive poles of a battery 4. The wire 2 I term the negative wire and the wire 3 I term the positive wire. Both of the battery terminal ends of these wires are provided with conductive terminal contacts 5 and 6, which are adapted to be connected to the poles of a battery. The negative wire 2 extends to an electrode 7 and the positive wire extends beyond the end of the electrode 7 to an electrode 8, which is positioned at a short distance from it. The distance apart of the electrodes may be varied to suit the conditions and requirements of their use and position in the stomach at the time the bipolar electrode is made.

Each of the electrodes 7 and 8 consists of a slug-shaped portion of conductive metal or material, preferably copper, and they are each inclosed in an insulating covering, which may consist of any suitable insulating material, hard rubber being preferable, and they are made in the form or shape of a capsule. These insulating capsule coverings are preferably made in two parts, 9 and 10, and 11 and 12 respectively. The parts 9 and 11 form cap portions and are provided with axial apertures 13 and 14 respectively, while the parts 10 and 12 consist substantially of thimble members, which are screwed upon the caps, as will be presently shown. The end of the rubber tube 1 extends into the aperture 13 of the cap 9, and is secured therein by a pressure fit or other suitable means. The electrodes 7 and 8 are provided with threaded shank portions which are adapted to screw into threaded apertures 13 and 14 of the caps, and the electrode 7 is provided with an axial passage 15 in line with an aperture 16 in the lower end of the thimble 10. A rubber tube 18 of smaller diameter than the tube 1 extends through said aperture 16 and into the passage 15 of the electrode 7, and its lower end extends into the aperture 14 of the cap 11. The cap portions 9 and 11 of these two electrode insulating capsules are each provided with a reduced threaded shouldered portion 19, upon which the thimble portions 10 and 12 are screwed. These thimble portions 10 and 12 extend over the slug-shaped electrodes and insulate them from direct contact with the gastric mucosa of the stomach, and at the same time the said thimbles permit a free diffusion and flow of electricity from one electrode to another through the fluids of the stomach, as shown in Fig. 3, by a plurality of apertures 20, which are formed in them. The insulated wire 2 extends beyond the lower end of the tube 1, and its lower end is stripped of the insulating material and is secured in any suitable manner to the electrode 7. In the present instance, it is shown extending into a hole which intersects the passage 15 in the said electrode, and thus the current is passed from the wire to the electrode. The insulated wire 3 extends down through the passage 15 of the electrode 7 through the rubber tube 18 and into the electrode 8, its lower end being stripped of the insulating material, as shown, so as to permit the current to pass from the said wire to the electrode. The thimbles are pointed or slug-shaped, as shown, and screw onto the caps 9 and 11 against their shoulders, thus forming capsule-shaped electrodes, which are of a size that can be easily swallowed by a patient.

My bi-polar intra-gastric electrode is especially adapted to the treatment of gastroptosis, motor insufficiency of stomach, relaxation of cardia or pylorus, and diverticulum of the esophagus.

In the present state of the art, a single intra-gastric insulated electrode is introduced into the stomach and an electric circuit is formed with it by placing an abdominal electrode on the outside of the abdomen of the body, but this method is unsatisfactory, as it applies the electric current to too small an area of the wall of the stomach, and but a small portion of the diffusing current strikes it, while the larger portion of the electric field diffuses over a much larger area of the abdomen, and affects the abdominal muscles and causes them to contract to a degree that renders its use inert in causing a contraction of the stomach. By means of my invention an ample amount of electric current is diffused uniformly to almost the entire wall of the stomach, as it flows from one electrode to the other, as shown in Fig. 3, and the electrodes, being insulated and covered by the non-conductive capsules, do not in the least injure the gastric mucosa of the stomach.

The operation is as follows: The physician inserts the electrodes far back into the mouth and the patient takes one or more swallows of water or of any suitable watery fluid and swallows the electrodes, which are finally positioned where desired by the physician. The contact terminals are then connected to a suitable battery. The liquid in the stomach acts as a conductor for the electric current between the electrodes, it being understood that the electrode would not give the desired result if a sufficient liquid medium were not present in the stomach, and the current flows through the wires 2 and 3 to the electrodes 7 and 8, and flows in a diffused arc-like stream from the perforated capsules through the fluid conductor in contact with substantially all parts of the wall of the stomach, and thus disseminates the electric current by diffusion directly in contact with and throughout the entire stomach, the treatment consisting of the continuous or interrupted flowing of the electric current in the stomach for a period generally ten minutes.

While I have illustrated and described the preferred construction and arrangement of my invention, I do not wish to be limited to the construction and arrangement shown, as my invention contemplates broadly a pair of suitable insulated circuit wires provided with insulated electrodes at one of their ends, adapted to be both inserted in the stomach in electrical connection with each other, and operatively connected at their opposite ends outside of the stomach to a suitable supply of electricity.

Having described my invention, what I claim as new and desire to secure by Letters Patent, is:

A bi-polar intra-gastric electrode comprising flexible tubing, insulated circuit wires within said tubing, a hollow insulated member attached to said tubing, said member having a bore in its lower end, a slug-shaped pole secured in said bore, to which pole is attached one of said circuit wires, a hollow perforated shell attached to the lower end of said member and inclosing said pole, said perforated shell having a hole in its lower end, flexible tubing passing through said hole and containing the second circuit wire, another hollow insulating member attached to the lower end of said tubing, a second pole secured in said hollow member and having attached thereto said second circuit wire, and a hollow perforated shell secured to the lower end of said insulating member and inclosing said pole.

In testimony whereof I affix my signature in presence of two witnesses.

ALLAN G. HURDMAN.

Witnesses:
G. SARGENT ELLIOTT,
ADELLA M. FOWLE.